(No Model.)
D. L. BARNES.
ENGINEER'S BRAKE VALVE.
No. 528,523. Patented Nov. 6, 1894.
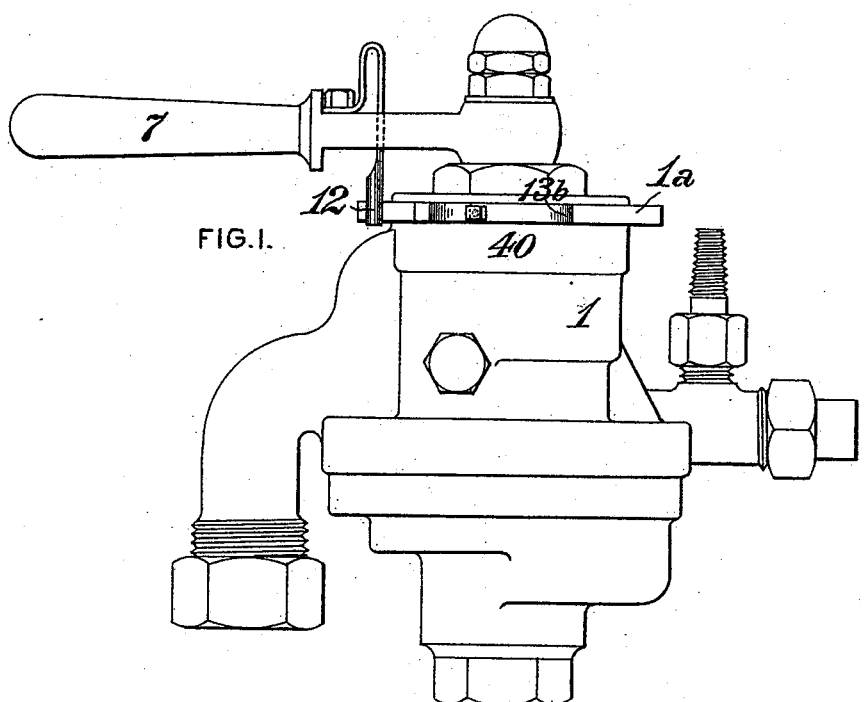
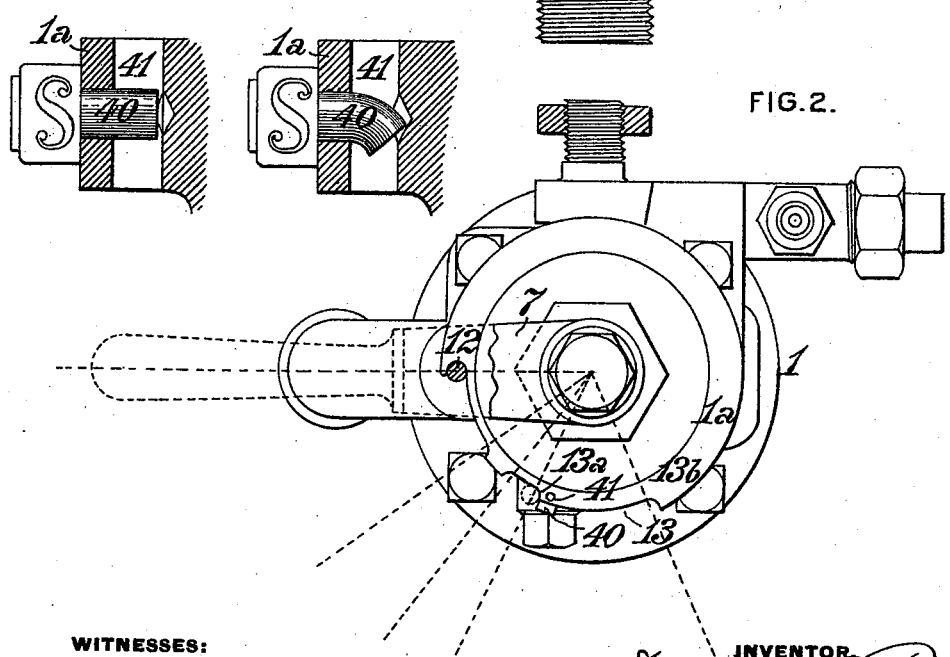
WITNESSES:
T. J. Hogan.
J. E. Gaither
INVENTOR,
David L. Barnes.
by Snowden Bell,
Att'y.

UNITED STATES PATENT OFFICE.

DAVID L. BARNES, OF CHICAGO, ILLINOIS.

ENGINEER'S BRAKE-VALVE.

SPECIFICATION forming part of Letters Patent No. 528,523, dated November 6, 1894.

Application filed June 9, 1894. Serial No. 514,044. (No model.)

*To all whom it may concern:*

Be it known that I, DAVID L. BARNES, of Chicago, in the county of Cook and State of Illinois, have invented a certain new and useful Improvement in Engineers' Brake-Valves, of which improvement the following is a specification.

My invention relates to the class of appliances, known as engineers' brake valves, which are employed in automatic air brake systems for effecting and controlling the supply and exhaust of air under pressure to and from the main air or train pipe of the system, in the release and the application, respectively, of the brakes.

The invention is particularly designed for application in connection with engineers' brake valves used in brake systems which are provided with quick action triple valves, by which a quick and powerful application of the brakes may be effected when required to make an emergency, but which, under normal conditions, are operated only to effect service or graduated applications of the brakes.
The object of my invention is to put a check upon and give an indication of, the needless and objectionable operation of the emergency or quick action mechanism by the engineer, under conditions in which a service application of the brakes would be necessary and proper.

To this end, my invention, generally stated, consists in the combination, with an engineer's brake valve, of an indicator or check piece fixed to the valve casing in such location as to be defaced or broken in and by the movement of the operating handle to emergency position.

The improvement claimed is hereinafter fully set forth.

It is well recognized in practice that the operation of the quick action or emergency members of the quick action triple valve, which has now become standard in automatic air brake apparatus, while of the greatest service and value in cases of emergency, where a stop is required to be made in the shortest possible time to avoid collision, derailment, or other impending danger, is not only unnecessary but also objectionable under ordinary conditions, as in slowing down or stopping at or between stations, and where there is no reason for an accident to be apprehended. The suddenness and shock of an emergency stop are inconvenient, unpleasant, and alarming to passengers, and may even tend to cause slight accidents by throwing them down if standing or causing them to strike the seats in advance. Orders are therefore given to engineers' of passenger trains not to make emergency stops, except under conditions of impending danger, but these orders are often disobeyed or neglected by careless or incompetent men.

My invention is designed to check or prevent, as far as practicable, such improper operation of the brake system, by presenting a record or indication that an emergency application has been made which will bring that fact to the attention of the proper authority, and make it necessary for the engineer to report the circumstances under which the stop was made, in order to show whether or not he was warranted in making it.

In the accompanying drawings: Figure 1, is a side view, in elevation, of an engineer's brake valve illustrating an application of my invention; Fig. 2, a plan or top view; Fig. 3, a view, in elevation, and on an enlarged scale, of the indicator or check piece as first inserted in position, and Fig. 4, a similar view showing it as fixed in position for operation.

My invention is herein shown as applied in connection with an engineer's brake valve of the standard Westinghouse type, as set forth in Letters Patent No. 401,916 to Geo. Westinghouse, Jr., and Frank Moore, dated April 23, 1889, which, as it is familiar to those skilled in the art, and does not, in and of itself, form part of my present invention, need not be herein fully or at length described.

In the practice of my invention I provide an indicator or check piece 40, which is composed of some soft metal or material which is easily broken, defaced, or displaced, and is fixed to the shell or casing 1 of the engineer's brake valve in such location thereon that it will be struck by and subjected to pressure from the operating handle 7 of the valve, or the spring stop 12, by which said handle is held in either of the several positions required for the operation of the brake system, in the movement of said handle to the position required to effect an emergency application of the brakes, that is, to the position in which the spring stop 12 abuts against the shoulder 13$^b$, at the right hand end of the circumferential recess 13 formed in the upper end flange, 1$^a$, of the valve casing 1.

The indicator or check piece 40 may be made of Babbitt metal, lead, tin, wood, paper pulp, or any other substance that can be broken off or bent without interfering with the action of the valve. Any material of the character of those mentioned, which would possess the capacity of being ordinarily permanent, for regular use, and of being broken or displaced when the handle is moved to the emergency position, without materially interfering with its movement thereto would be suitably adapted for use under my invention.

In the instance shown, the indicator or check piece 40 is composed of a cylindrical body which is fitted into a hole in the flange 1$^a$, and a head which projects from said body, in the path of the spring stop 12, so as to be struck by said spring stop, and subjected to pressure therefrom, as the handle and spring stop are moved toward the shoulder 13$^b$, to effect an emergency application of the brake. In effecting an ordinary or service application, such as should be made in all cases except under conditions of impending danger, the spring stop 12 abuts against the shoulder 13$^a$, to the left of the indicator or check piece, and does not therefore have any effect thereon, but when making an emergency application, the spring stop must pass the indicator or check piece to reach the shoulder 13$^b$. The indicator or check piece is not sufficiently strong to oppose any substantial resistance to the passage of the spring stop, and permits such passage, but is broken or defaced by the spring stop therein and thereby. Such breakage or disfigurement indicates to the round house foreman or other person in charge of engines at terminals, that an emergency application has been made, and renders it incumbent upon the engineer to report the reason for the stop and the conditions under which it was made, before obtaining a new indicator or check piece, so that neglect or disobedience of orders as to manipulation of brakes, may be brought home to him, if it has occurred.

As shown in Figs. 3 and 4, the indicator or check piece 40 may be inserted in a horizontal hole in the flange 1$^a$ of the valve casing, and held in position by turning down its body, as shown in Fig. 4, which is effected by a pin inserted through a vertical hole 41 in the flange. Such specific location of the indicator or check piece is not, however, essential, as it may, under my invention, have any other suitable and convenient one, in which it will be acted on by the operating handle, or the spring stop, when the same is moved beyond the position proper for effecting a service application of the brakes.

I claim as my invention and desire to secure by Letters Patent—

1. The combination of an engineer's brake valve, and an indicator or check piece fixed to the valve casing in such location as to be defaced or broken in and by the movement of the operating handle to emergency position, substantially as set forth.

2. The combination, with an engineer's brake valve, of an indicator or check piece, of soft material, fixed to the valve casing and projecting therefrom across the line of movement of the operating handle, between the service and the emergency positions thereof, substantially as set forth.

3. The combination, in an engineer's brake valve, of an operating handle which is movable between release and emergency positions; a stop or detent connected thereto, and an indicator or check piece of soft material fixed to the valve casing and projecting therefrom across the path of the stop or detent, between the service and emergency positions thereof, substantially as set forth.

DAVID L. BARNES.

Witnesses:
EMIL W. ROSENBERG,
CHAS. T. BAYLESS.